(12) United States Patent
Kodama (10) Patent No.: US 6,400,473 B1
(45) Date of Patent: Jun. 4, 2002

(54) IMAGE READER

(75) Inventor: Shinichi Kodama, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/133,141

(22) Filed: Aug. 12, 1998

(30) Foreign Application Priority Data

Aug. 25, 1997 (JP) .............................................. 9-228507

(51) Int. Cl.[7] ................................................ G03F 3/10
(52) U.S. Cl. ...................... 358/527; 358/527; 358/506; 358/538
(58) Field of Search ................................. 358/505, 506, 358/537, 538, 451, 452, 453, 474, 487, 509

(56) References Cited

U.S. PATENT DOCUMENTS

| | | | | |
|---|---|---|---|---|
| 4,468,693 A | * | 8/1984 | Fujit et al. ...................... 358/78 |
| 4,482,924 A | * | 11/1984 | Brownstein .................. 358/302 |
| 5,383,035 A | * | 1/1995 | Suzuki ......................... 358/500 |
| 5,477,353 A | * | 12/1995 | Yamasaki .................... 358/487 |
| 5,633,726 A | * | 5/1997 | Timmermans ................. 386/70 |
| 5,703,701 A | * | 12/1997 | Yamamoto et al. .......... 358/487 |
| 5,754,221 A | * | 5/1998 | Nishimura et al. ............. 348/97 |
| 5,768,444 A | * | 6/1998 | Nishimura .................. 382/298 |

FOREIGN PATENT DOCUMENTS

JP 6-98092 4/1994 ............ H04N/1/04

* cited by examiner

Primary Examiner—David Moore
Assistant Examiner—Kevin C Kianni
(74) Attorney, Agent, or Firm—Frishauf, Holtz, Goodman, Langer & Chick, P.C.

(57) ABSTRACT

This invention provides an image reader which simply fetches a film image as an image of substantially the same size and the same image quality irrespective of issuance of a trimming command. In the image reader, information related to a trimming area can be read from a developed film by use of a magnetic information reading circuit. Further, light is applied to the developed film and image information is read based on light transmitted therethrough by use of an image input circuit. The resolution set when the image input circuit fetches image information from a preset trimming area is determined by a control circuit based on trimming information from the magnetic information reading circuit.

13 Claims, 5 Drawing Sheets

IMAGE READER

BACKGROUND OF THE INVENTION

This invention relates to an image reader and more particularly to a system for simplifying the image information fetching operation by use of magnetic information of a film.

The technique for recording trimming information as magnetic information on a magnetic information recordable film such as an IX240 film and changing the fetching area based on the trimming information recorded on the magnetic recording portion of the film when an image is fetched by use of a scanner is disclosed in Jpn. Pat. Appln. KOKAI Publication No. 6-98092.

However, if the image in the area specified for trimming is fetched with the resolution kept unchanged, the fetched image becomes smaller according to the trimming size. On the other hand, if the output size of a trimmed image is made equal to the output size of a normal image which is not specified for trimming, the resolution becomes rough. Therefore, it is necessary to adjust the resolution when the trimming operation is effected, but the user must set the resolution and it is troublesome.

BRIEF SUMMARY OF THE INVENTION

Accordingly, an object of this invention is to provide an image reader capable of simply fetching a film image as an image of the same image quality and substantially the constant size irrespective of the trimming specification.

In order to attain the above object, an image reader according to a first aspect of this invention comprises trimming information reading means for reading information related to a trimming area from a developed film; image information reading means for reading image information from the developed film by applying light to the developed film; and reading resolution determining means for determining the resolution set when the image information reading means reads image information from a preset trimming area based on trimming information from the trimming information reading means.

An image reader according to a second aspect of this invention comprises magnetic information reading means for reading information related to a trimming area recorded on a magnetic recording portion of a developed film; photographing means including a line sensor for applying light to the developed film and reading image information based on light transmitted therethrough; and reading resolution determining means for determining the resolution at the reading time to set the size of an image plane formed by image information fetched by the photographing means to a preset size and set the image quality thereof to a preset level based on the trimming area information read by the magnetic information reading means.

Further, an image reading system according to a third aspect of this invention comprises a camera capable of writing information related to a trimming area specified by trimming area specifying means for specifying a trimming area into a magnetic recording portion of a film with the magnetic recording portion; and a scanner having trimming information reading means for reading information related to a trimming area from the magnetic recording portion of the developed film, wherein the scanner includes photographing means for applying light to the developed film and reading image information based on light transmitted therethrough, reading resolution determining means for determining the resolution set when the photographing means fetches image information from a preset trimming area based on trimming information from the trimming information reading means, and control means for controlling the photographing means based on the determined resolution.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An image reader according to an embodiment of the present invention will be described. The image reader comprises a camera and a scanner. The camera optically records images on a film, such as IX240 film, which has a magnetically recordable portion. The camera magnetically records trimming zoom information for each image on the magnetically recordable portion. The film is stored in a cartridge after it has been developed. The scanner reads each image from the film in the form of an electronic image and also the trimming zoom information from the magnetically recordable portion of the film. The scanner stores the electronic images sequentially, while automatically assigning a resolution to each electronic image in accordance with the trimming zoom information.

The zoom lens of the camera may be moved to the telescope side, thereby recording an optical image zoomed to a maximum on the film. The image information representing such a zoomed image is electrically processed, thereby enlarging the image. The size of the image thus enlarged can be recognized from the mask displayed on the finder of the camera.

When any image optically recorded on the film is thus enlarged, the image displayed on the finder is changed. At the same time, the trimming information about the image enlarged is magnetically recorded on the film. Needless to say, the optical image recorded on the film remains unchanged in size.

There will now be described an embodiment of this invention with reference to the accompanying drawings.

Figure 1:
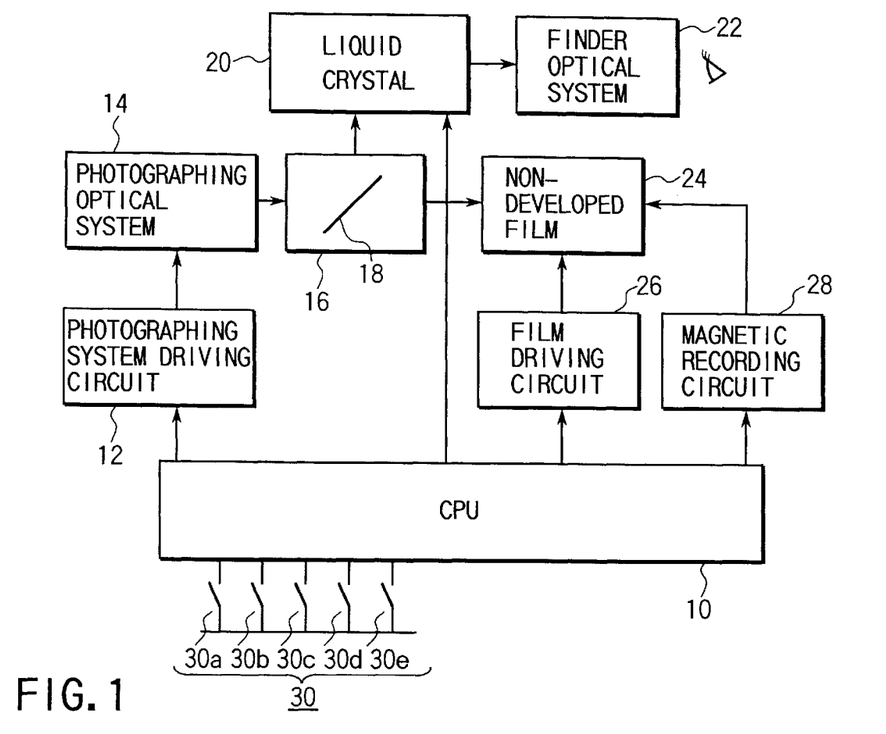
FIG. 1 is a block diagram of a portion of a camera side according to one embodiment of this invention.

FIG. 1 is a block diagram of a portion of a camera side according to one embodiment of this invention.

In FIG. 1, a CPU 10 drives a photographing optical system 14 via a photographing system driving circuit 12. A light beam from a subject is transmitted to the photographer via the photographing optical system 14, a mirror 18 in a mirror box 16, liquid crystal display 20 for display, and finder optical system 22.

At the time of photographing, an image is formed on a non-developed film 24 via the photographing optical system 14 and mirror box 16. The non-developed film 24 is driven by means of a film driving circuit 26 and magnetically recorded by means of a magnetic recording circuit 28 under the control of the CPU 10.

Further, the CPU 10 is connected to an operation switch 30 including a main switch 30a, first release (1st R) switch 30b, second release (2nd R) switch 30c, telephoto side zoom (zoom T) switch 30d and wide-angle side zoom (zoom W) switch 30e and detects status signals from the above switches.

Although not shown in FIG. 1, the functions such as AF (automatic focusing), AE (automatic exposure) which the camera usually has are naturally provided.

With the above construction, a light beam of the subject image fetched by the photographing optical system 14 is transmitted to the photographer via the mirror 18 in the mirror box 16, liquid crystal display 20 and finder optical system 22. At this time, in the liquid crystal display 20, the trimming zoom state which is set is displayed.

The light beam reflected from the subject is ultimately supplied to the film 24 undeveloped. The CPU 10 detects the state of operation switch 30. The driving circuit 12 drives the zoom lens of the optical system 14. When the zoom lens reaches the deep focal point, the liquid crystal display is controlled and displays the trimming zoom state on the finder.

Further, information of the trimming zoom is recorded on the non-developed film 24 via the magnetic recording circuit 28 while the non-developed film 24 is being driven.

The trimming zoom in the present embodiment is so set as to take a discrete value with the optical axis set as a center after the optical system has reached the limited position on the long focal length side.

Figure 2:
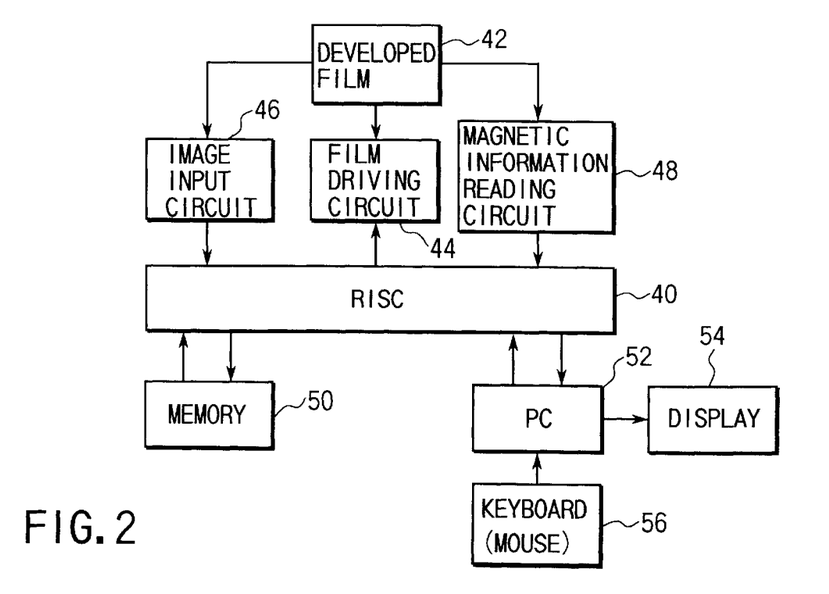
FIG. 2 is a block diagram of a portion of a scanner side according to one embodiment of this invention.

FIG. 2 is a block diagram showing a portion of the scanner side according to one embodiment of this invention.

In FIG. 2, the scanner includes a film driving circuit 44 for driving a developed film 42, an image input circuit 46 for reading a film image by use of a line sensor, a magnetic information reading circuit 48 for reading magnetic information recorded on the magnetic recording portion of the developed film 42, a memory 50 for storing a read image and magnetic information, and a control circuit (RISC) 40 for controlling the image input circuit 46, film driving circuit 44, magnetic information reading circuit 48 and memory 50 and performing communication with a personal computer (PC) 52.

On the personal computer 52 side, a display 54 for displaying a fetched image and control information and a keyboard/mouse 56 for operating the personal computer 52 are connected to the personal computer 52. As a scanner system shown here, for example, an image input device disclosed in Jpn. Pat. Appln. KOKAI Publication No. 9-8974 may be used and the detail explanation therefor is omitted.

With the above construction, an image on the developed film 42 is read by the image input device 46. The magnetic information recorded on the magnetic recording portion of the developed film 42 is read by the magnetic information reading circuit 48. In the magnetic information reading circuit 48, the resolution is automatically determined according to information related to the trimming zoom in the magnetic information such that the fetched image size will be made substantially the same size irrespective of the trimming zoom.

The thus fetched image and magnetic information are stored into the memory 50 via the control circuit 40 or transmitted to the personal computer 52 side via the control circuit 40.

Figure 3:
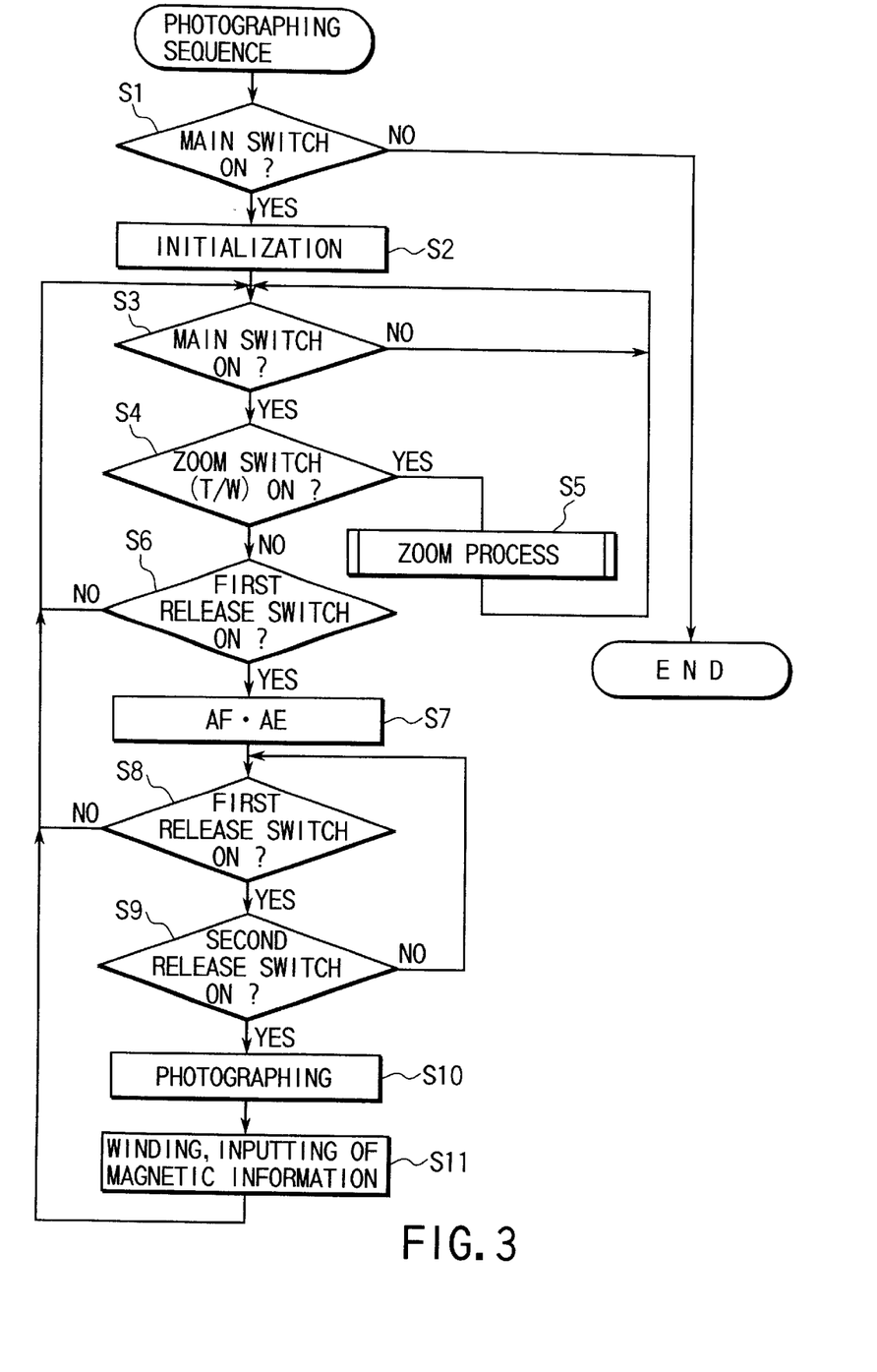
FIG. 3 is a flowchart for illustrating the operation sequence of the camera side.

Next, the operation sequence of the camera side is explained with reference to the flowchart of FIG. 3.

Figure 5:
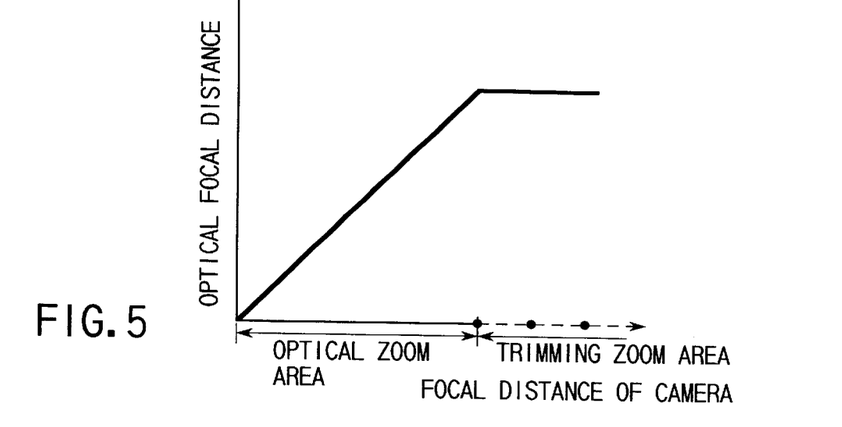
FIG. 5 is a diagram showing the relation between the focal distance of the camera and the focal distance of an actual photographing optical system.
Figure 6A:
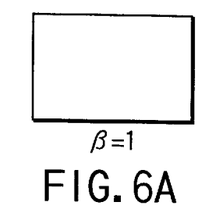
FIG. 6A is a view showing the display state of a finder at the time of trimming zoom and showing an optical zoom area with a trimming zoom value β=1.
Figure 6B:
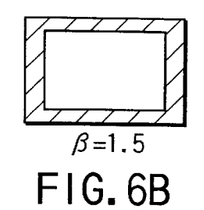
FIG. 6B is a view showing the display state of the finder at the time of trimming zoom and showing a discrete trimming state with the trimming zoom value β=1.5.
Figure 6C:
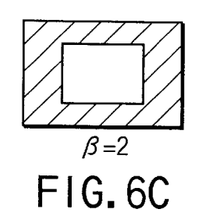
FIG. 6C is a view showing the display state of the finder at the time of trimming zoom and showing a discrete trimming state with the trimming zoom value β=2.0.

In the present embodiment, the fetching resolution is unconditionally determined according to trimming information. Specifically, the trimming information includes information related to the size of trimming, for example. The "trimming" indicates that an image lying inside the area of an image of the telephoto end in a state obtained after the zooming is optically effected from the wide-angle end to the telephoto end as shown in FIGS. 5 and 6 as will be described later is enlarged.

When the photographing sequence is started, whether the main switch 30a is set in the ON state or not is determined in the step S1. If the main switch 30a is set in the OFF state, the sequence is terminated. On the other hand, if the main switch 30a is set in the ON state, the step S2 is effected for initialization (initialization of zooming and the like).

Then, in the step S3, whether the main switch 30a is set in the ON state or not is determined to terminate the present sequence on the way. If the main switch 30a is set in the OFF state, the sequence is terminated. On the other hand, if the main switch 30a is set in the ON state, the next step S4 is effected to determine the states of the zoom switches 30d and 30e (telephoto, wide angle).

If it is determined in the step S4 that one of the zoom switches 30d and 30e is set in the ON state, the step S5 is effected to perform the sub-routine "zoom process" and then the process is returned to the step S3. If it is determined in the step S4 that neither of the zoom switches 30d and 30e is set in the ON state, the step S6 is effected to determine the state of the first release switch 30b for start of photographing.

If it is determined in the step S6 that the first release switch 30b is set in the OFF state, the process is returned to the step S3. If the first release switch 30b is set in the ON state, the step S7 is effected to effect AF, AE which are generally effected in the normal camera.

Next, in the steps S8 and S9, the states of the first release switch 30b and second release switch 30c are determined. If it is determined in the step S8 that the first release switch 30b is set in the OFF state, the process is returned to the step S3. If the first release switch 30b is set in the ON state and the second release switch 30c is set in the OFF state, the process is returned to the step S8. Further, if both of the first and second release switches 30b and 30c are set in the ON state, the step S10 is effected to perform the photographing sequence of the camera.

After the photographing sequence, information related to the trimming zoom is recorded as magnetic information together with standardized information such as date at the same time of film winding in the step S11.

For recording magnetic information, it is possible to record a standardized signal and record trimming zoom information as information inherent to the scanner in a non-standardized area in the same track. Further, it is possible to record the information in a different track.

Further, trimming zoom information can be input so as to extract an image using a desired angle of view instead of the center of the optical axis.

Figure 4:
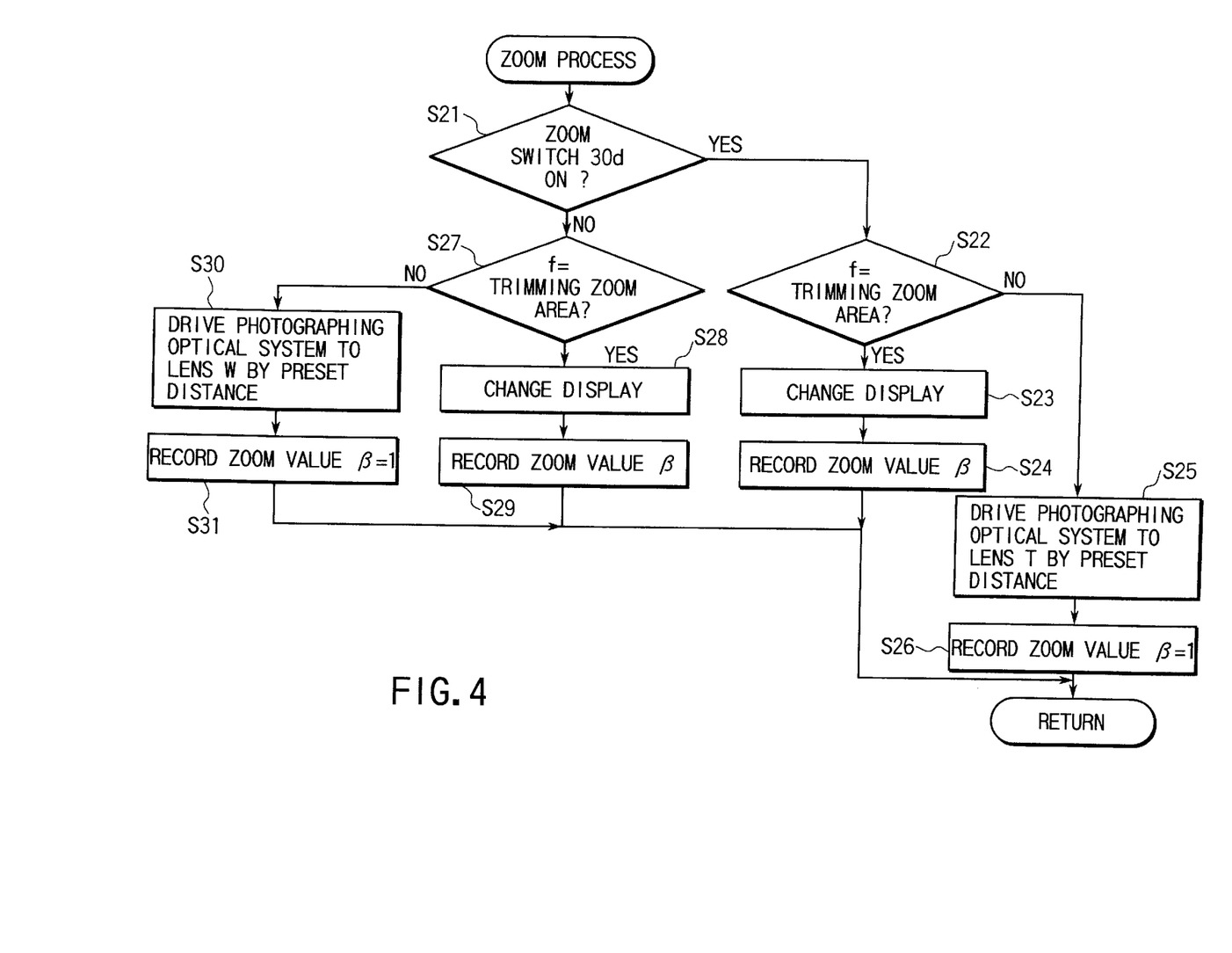
FIG. 4 is a flowchart for illustrating the operation sequence of a sub-routine relating to the zooming process of a camera.

FIG. 4 is a flowchart for illustrating the operation sequence of a sub-routine related to the zoom process of the camera.

When the zoom process is started, first, the state of the switch operated is determined in the step S21. If the telephoto side zoom switch 30d is turned ON, the step S22 is effected to determine whether or not the present photographing optical system 14 has reached a long focal length position.

If it is determined in the step S22 that it has reached the long focal length position, the step S23 is effected to change display in the finder of the camera to long focal length display indicating the trimming zoom area. If it is determined in the step S22 that the long focal length display of the trimming zoom has been reached, no display change is made.

Then, in the step S24, a trimming zoom value β is set. In this case, the trimming zoom value β is set to 1 in the optical zoom area and it is set to a value larger than 1 in the trimming zoom area.

If it is determined in the step S22 that the long focal length position is not yet reached, the step S25 is effected to drive the photographing optical system 14 towards the long focal length side by a preset distance. Then, the trimming zoom value β is set to 1 in the step S26.

If it is determined in the step S21 that the telephoto side zoom switch 30d is not set in the ON state, that is, the wide-angle side switch 30e is set in the ON state, the step S27 is effected to determine whether or not the present photographing optical system 14 has reached the long focal length position. In this case, if the trimming zoom display is reached in the long focal length position, the step S28 is effected to change the display to the wide-angle side in the trimming zoom display.

Next, the trimming zoom value β is set in the step S29 and the present sequence is terminated.

If it is determined in the step S27 that the long focal length position has not been reached, the step S30 is effected to drive the photographing optical system 14 towards the short focal length side by a preset distance. Then, the trimming zoom value β is set to 1 in the step S31.

FIG. 5 is a diagram showing the relation between the focal distance of the camera and the focal distance of an actual photographing optical system. In FIG. 5, the abscissa indicates a zoom value which can be set by the zoom switch and the ordinate indicates a zoom value of the photographing optical system.

The relation linearly changes until the optical system can cope with a variation in the focal distance of the camera, but when the photographing optical system has reached the long focal length position, a discrete trimming zoom area is started.

FIGS. 6A to 6C are views showing the display states of the finder at the time of trimming zoom.

FIG. 6A shows the optical zoom area and the entire plane of the finer is changed according to the zoom value. In this case, the trimming zoom value β is set to 1.

FIGS. 6B and 6C are views showing the discrete trimming states. In this case, the trimming zoom values are respectively set to 1.5 and 2.0.

On the finder, the photographing range is changed in size by using a liquid crystal mask or the like, as the zooming operation is carried out. On the photographing film, the image obtained by setting the zoom lens at the telescope side is recorded, and the trimming area is not recorded at all.

In this example, two values of the discrete trimming zoom are shown, but the number of values can be increased and a combination of the trimming zoom and the optical zoom can be used.

Further, the trimming zoom position may be set in a desired position instead of the center of the optical axis or the aspect ratio may be changed.

Figure 7:
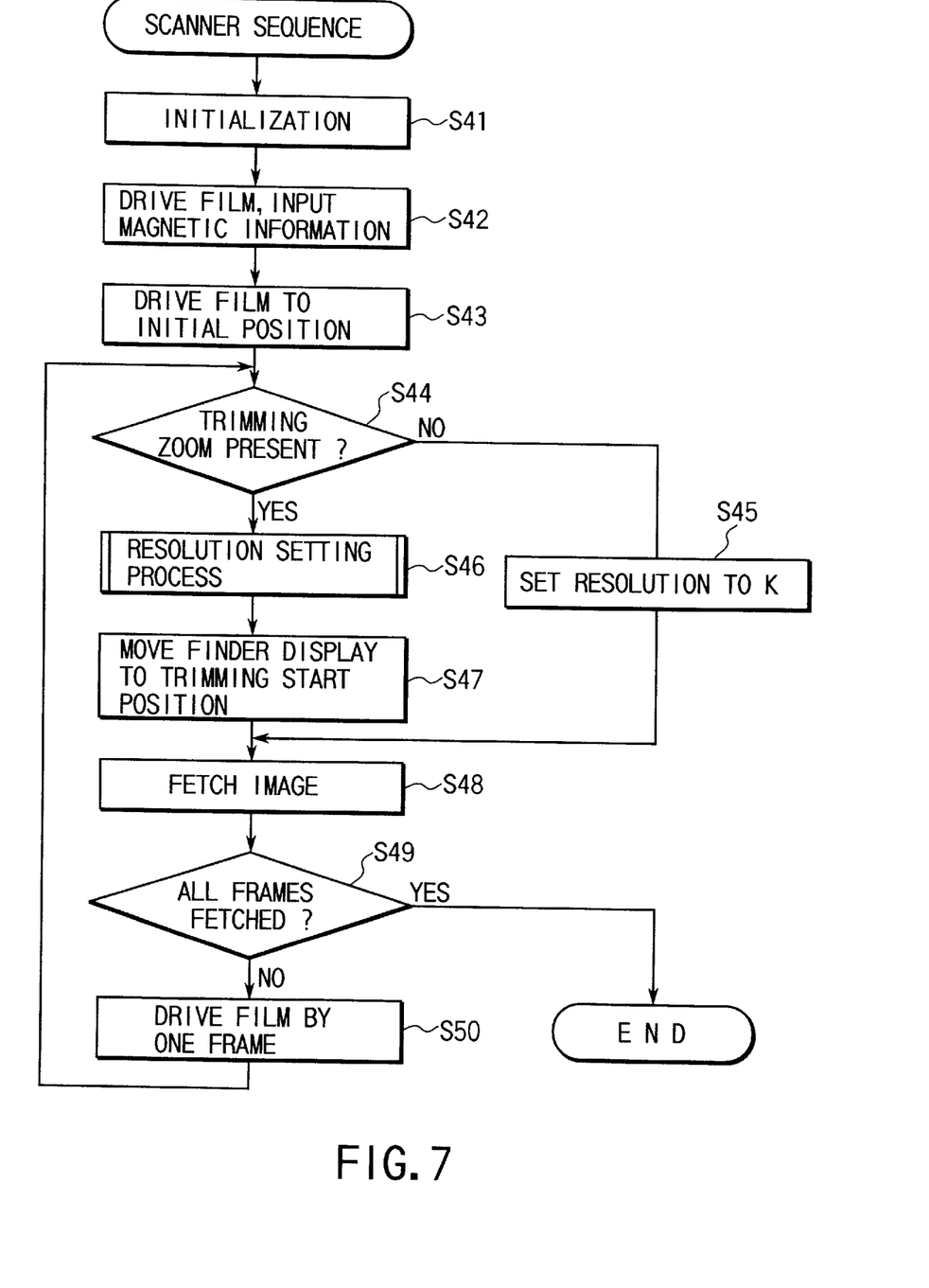
FIG. 7 is a flowchart for illustrating the image fetching operation sequence on the scanner side.

FIG. 7 is a flowchart showing the image fetching operation sequence on the scanner side.

If the sequence on the scanner side is started according to the flowchart of FIG. 7, first, the initialization step (of setting the resolution K to a preset value and the like) is effected in the step S41. Then, in the step S42, all of the frames of the film are fed and magnetic information recorded thereon is read and stored. After the reading step, the film is driven to the initial position in the step S43.

Next, in the step S44, the content of magnetic information of an image to be fetched is determined. If the trimming zoom is present, the step S46 is effected to execute the sub-routine "resolution setting" for setting the resolution. After this, in the step S47, the finder display is moved to the trimming start position. However, in this case, if an error occurs in the resolution setting process and the resolution is set at K, a whole image is fetched and the movement of the finder display is not performed. Then, in the step S48, the image is fetched by use of the thus set resolution.

If it is determined in the step S44 that the trimming zoom is not present, the step S45 is effected to set the resolution to K. Then, in the step S48, the image is fetched by use of the thus set resolution.

Next, in the step S49, whether all of the frames are fetched or not is determined. If it is determined that not all of the frames are fetched, the step S50 is effected to feed the film by one frame and then the step S44 is effected again. If all of the frames are fetched, the present sequence is terminated.

Figure 8:
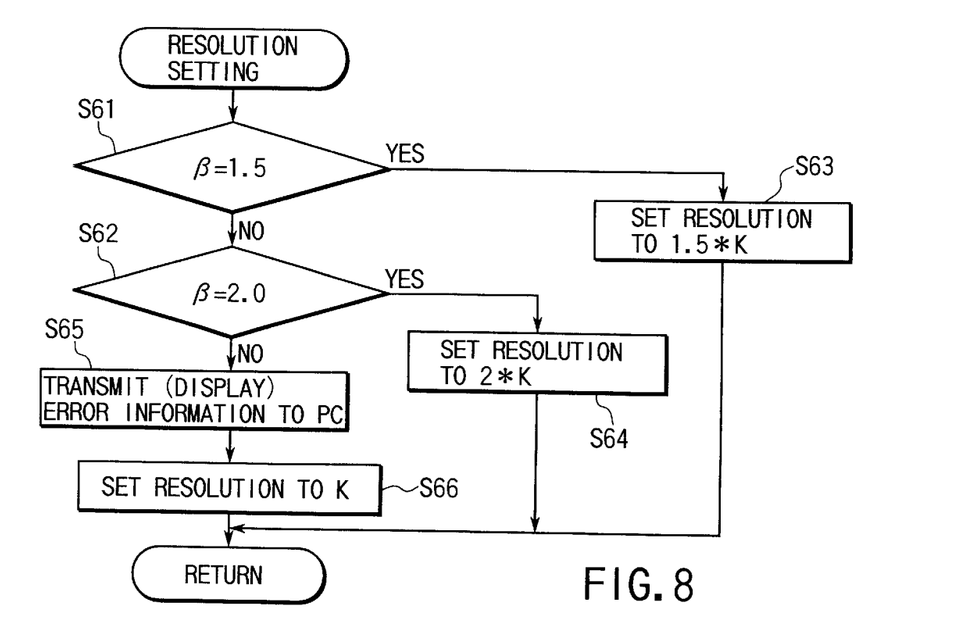
FIG. 8 is a flowchart for illustrating the operation sequence for determining the resolution.

In the step S49, whether the image fetching operation for all of the frames is terminated or not is determined, but this is not limitative and it is possible to determine whether or not the image fetching operation for a desired number of frames is terminated FIG. 8 is a flowchart for illustrating the operation sequence for setting the resolution.

If the resolution setting process is started according to the flowchart of FIG. 8, the trimming zoom value β is checked in the steps S61 and S62. If the trimming zoom value β is 1.5, the step S63 is effected to set the resolution to K*1.5 (1.5 times K) and then the present sequence is terminated. If the trimming zoom value β is 2.0, the step S64 is effected to set the resolution to K*2.0 (2.0 times K) and then the present sequence is terminated.

If it is determined in the steps S61 and S62 that β is neither 1.5 nor 2.0, an error may occur, and therefore, information indicating occurrence of an error is transmitted to the personal computer 52 in the step S65 to display warning on the display 54 on the personal computer side. After this, in the step S66, the operation for fetching the whole image is set again, the resolution is set to K and the present sequence is terminated.

As is explained in the above embodiment, when the trimming zoom photographing is effected at the time of photographing, an image of substantially the same size can be fetched without effecting any troublesome operation by recording trimming zoom information as magnetic information on the film and using the trimming zoom information recorded on the film when the image is fetched.

Further, in the embodiment explained above, it is possible to use an area sensor instead of the line sensor so as to change the magnification of the optical system for optically photographing an image on the film.

In addition, if the line sensor or the like is used in the image input circuit 46 in the scanner, it is not necessary to use the whole portion of the line sensor at one time. The image may be fetched by using a portion of one line, for example, a half portion of one line and effecting the scanning operations two or more times.

Further, the magnetic reading operation may be effected immediately before the reading operation for each image. It is, of course, possible to separately and freely set the reading size.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image reader comprising:
   trimming information reading means for reading trimming zoom information given by a camera when photographing is carried out at a predetermined zoom magnification, the trimming zoom information defining an area of an image to be read from a developed film as an image reading range, the image reading range being smaller than an area of a normal photographic image picked up on the film;
   image information reading means for reading image information from the developed film by applying light to the developed film; and
   reading resolution determining means for automatically determining the resolution at which said image information reading means reads image information from the developed film, in accordance with the image reading range defined by the trimming zoom information read by said trimming information reading means, such that an image obtained to have a predetermined fetched-image size has substantially the same quality as other obtained images.

2. An image reader according to claim 1, wherein the trimming zoom information indicates magnification β for the area of the normal photographic image, which is given by the following formula:

$$1 \geq \beta.$$

3. An image reader according to claim 1, wherein the trimming zoom information indicates magnification β for the area of the normal photographic image, and the resolution is determined in advance in accordance with the magnification β.

4. An image reader according to claim 1, wherein the developed film is a film with a magnetic recording portion and said trimming information reading means includes magnetic information reading means.

5. An image reader according to claim 1, wherein the image information reading means is a line sensor.

6. An image reader comprising:
   trimming information reading means for reading trimming zoom information given by a camera when photographing is carried out at a predetermined zoom magnification, the trimming zoom information defining an area of an image to be read from a developed film as an image reading range, the image reading range being smaller than an area of a normal photographic image picked up on the film;
   image information reading means for reading image information from the developed film by applying light to the developed film; and
   reading resolution determining means for automatically determining the resolution at which said image information reading means reads image information from the developed film, in accordance with the image reading range defined by the trimming zoom information read by said trimming information reading means, such that an image obtained to have a predetermined fetched image size has the same read data amount as other obtained images.

7. An image reader according to claim 6, wherein the trimming zoom information indicates magnification β for the area of the normal photographic image, which is given by the following formula:

$$1 \geq \beta.$$

8. An image reader according to claim 6, wherein the trimming zoom information indicates magnification β for the area of the normal photographic image, and the resolution is determined in advance in accordance with the magnification β.

9. An image reader according to claim 6, wherein the developed film is a film with a magnetic recording portion and said trimmed information reading means includes magnetic information reading means.

10. An image reading system comprising:
    a camera capable of writing trimming information related to a trimming area specified by trimming area specifying means into a magnetic recording portion of a film with the magnetic recording portion at a photographing time, the trimming information indicating that an area of an image to be read from a developed film is smaller than an area of a normal photographic image picked up on the film; and
    a scanner having trimming information reading means for reading the trimming information from the magnetic recording portion of the developed film,
    wherein said scanner includes:
    photographing means for applying light to the developed film at a photographing time and reading image information based on light transmitted therethrough;

reading resolution determining means for automatically determining the resolution at which said image information reading means reads image information from the developed film, in accordance with the image reading range defined by the trimming zoom information read by said image trimming information reading means, such that an image obtained to have a predetermined fetched image size has substantially the same quality or read data amount as other obtained images; and control means for controlling said photographing means based on the determined resolution.

11. An image reader according to claim 10, wherein said reading resolution determining means determines the resolution to set the amount of data representing the size of the image represented by fetched image information, substantially at a preset value.

12. An image reading system according to claim 10, wherein said reading resolution determining means determines the resolution to keep the amount of data of image plane size formed according to fetched image information at a preset amount.

13. An image reading system according to claim 10, wherein said camera is a camera capable of zooming and said trimming area specifying means provided on said camera specifies a trimming area in a state in which the optical zoom value becomes maximum.

* * * * *